Nov. 4, 1941.    R. E. CROSS    2,261,829
HYDRAULIC FEED FOR MACHINE TOOLS
Filed Oct. 12, 1940
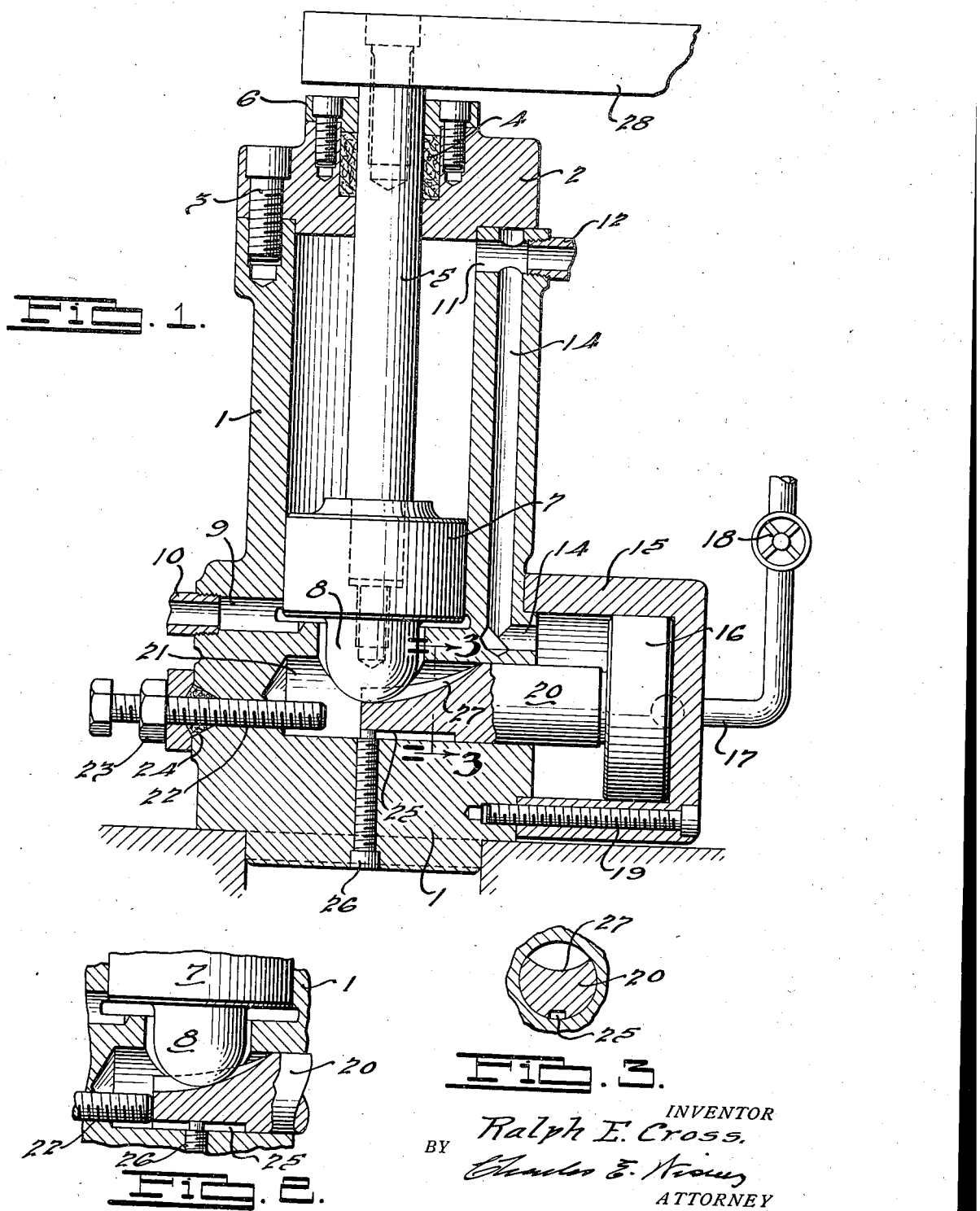
INVENTOR
Ralph E. Cross.
BY
ATTORNEY Patented Nov. 4, 1941

2,261,829

UNITED STATES PATENT OFFICE 2,261,829

HYDRAULIC FEED FOR MACHINE TOOLS

Ralph E. Cross, Detroit, Mich.

Application October 12, 1940, Serial No. 360,920

6 Claims. (Cl. 121—45)

This invention relates to hydraulic feeds for machine tools and the object of the invention is to provide a hydraulic cylinder for controlling the feed of a machine tool to provide a comparatively rapid feed at first and a gradually decreasing speed of feed toward the finish of the operation.

Another object of the invention is to provide a hydraulic cylinder having a piston arranged for movement in one direction and a second piston arranged for movement transversely to the first piston, the second piston being provided with a stem having a cam face contacted by the first piston whereby longitudinal movement of the second piston allows controlled movement of the first piston on the cam face.

A further object of the invention is to provide an arrangement of the character described in which the stroke of the second piston may be adjusted to utilize all or a portion of the cam face on the stem of the second piston.

A further object of the invention is to provide an arrangement of the character described in which the second piston is provided with a restricted outlet while the first cylinder is provided with a free outlet so that when the hydraulic medium under pressure is applied to both pistons the movement of the first piston will be comparatively rapid while the movement of the second piston is retarded by the restricted outlet which limits or determines the period of time for the second piston to complete its stroke.

These objects and the several novel features of the invention are hereinafter more fully described and claimed and the preferred form of construction by which these objects are attained is shown in the accompanying drawing in which—

Fig. 1 is a longitudinal section through a hydraulic feed cylinder for machine tools embodying my invention.

Fig. 2 is a view similar to Fig. 1 showing the second piston stem at the beginning of its stroke.

Fig. 3 is a section taken on line 3—3 of Fig. 1.

The cylinder 1 shown in Fig. 1 is provided with a head 2 secured thereto by the machine screws 3. This head 2 is provided with a packing 4 for the piston stem 5 and with a cap 6 secured in place by screws as shown. Secured to the stem 5 is a piston 7 movable longitudinally of the cylinder 1 and this piston 7 is provided with a semispherical end or extension 8 shown in Figs. 1 and 2. The cylinder 1 is provided with an outlet 9 at the bottom into which a pipe 10 is threaded and is also provided with an inlet 11 at the top into which an inlet pipe 12 is threaded for the hydraulic medium.

The wall of the cylinder 1 is provided with a bore 14 open to the inlet 11 and this bore 14 at the lower end opens into a cylinder 15 for the second piston 16. The cylinder 15 is provided with an outlet 17 in the end opposite the inlet 14 and the outlet pipe 17 is provided with a manually operable valve 18 which may be utilized to restrict the flow of the hydraulic medium from the cylinder 15. This cylinder 15 is secured to the cylinder block 1 by machine screws 19 as shown in Fig. 1. The piston 16 is provided with a stem 20 which extends into the bore 21 in the cylinder block 1 and is movable longitudinally of this bore but is limited in its movement to the left of Fig. 1 by the adjustable screw 22 which is provided with a lock nut 23 and with a packing 24 to prevent leakage about the adjusting screw. The stem 20 is provided with a way 25 in the bottom as shown in Figs. 1, 2 and 3 and a screw 26 extends into this way and prevents the stem 20 from turning in the bore 21.

The upper face of the stem 20 toward the end is cut away to provide a cam face 27 which is arcuate in cross section as shown in Fig. 3 and is shaped so that the semispherical end or extension 8 of the piston 7 may ride on this cam face 27. Secured to the upper end of the stem 5 of the piston 7 is an arm 28 which feeds the cutting tool and the object of the invention is to move this arm comparatively fast at the beginning of its movement and to gradually decrease the movement of this arm and the feed of the cutting tool in cases where it is desired to take a more rapid cut at the beginning and decrease the speed of cut at the finish of the operation.

In operation, the hydraulic medium under pressure passes through the conduit 12 and inlet 11 to move the piston 7 downwardly. At this time, the stem 20 of the piston 16 is in the position shown in Fig. 2 and as the semi-spherical end 8 of the piston 7 contacts the cam face 27 the cutting operation begins. By means of the conduit 14 in the cylinder wall 1 the hydraulic medium enters the cylinder 15 and tends to force the piston 16 to the right of Fig. 1. The outlet conduit 17 is restricted by the valve 18 which is set to restrict the flow of hydraulic medium from the cylinder 15 and thus the pressure on the hydraulic medium through the conduit 14 slowly moves the piston 16 to the right as controlled by the setting of the valve 18. As the piston 16 and piston stem 20 move toward the right, the hydraulic medium forcing the piston 7 downwardly presses the semi-spherical end 8 against the cam face 27 until the piston stem 20 has moved from the position shown in Fig. 2 to that shown in Fig. 1.

Due to the shape of the cam face 27, this gradually decreases the downward movement of the piston 7 so that the tool is taking a very fine cut at the time the piston 16 and stem 20 reach the position shown in Fig. 1. The speed of this movement may be accurately controlled by means of the valve 18 which may be manually adjusted to allow a slow or more rapid movement of the piston 16 as desired. By means of the adjustable screw 22 the stroke of the piston 16 and piston stem 20 may be adjusted so that the semi-spherical end 8 of the piston 7 rides the full length of the cam face 27 or any portion of its length as indicated in Fig. 2.

From the foregoing description it becomes evident that the device is very simple and efficient in operation, will not easily get out of order, provides a means for accurately controlling the tool feed and provides a device which accomplishes the objects described.

Having thus fully described my invention, its utility and mode of operation, what I claim and desire to secure by Letters Patent of the United States is:

1. In a hydraulic feed for machine tools, a first cylinder, a second cylinder arranged transversely to the first cylinder, a piston in each cylinder, hydraulic means for moving the pistons simultaneously, a stem on the second piston extending into the path of movement of the first piston, a cam face on said stem arranged to be engaged by the first piston, the arrangement being such that the cam face on said stem limits movement of the first piston by the hydraulic medium, means restricting movement of the second piston and stem in one direction by the hydraulic medium and adjustable means limiting movement of the second piston and stem in the opposite direction, said adjustable means being variable to predetermine the portion of the cam face engaged by the first piston.

2. In a hydraulic feed for machine tools, a first and a second hydraulic cylinder arranged transversely to each other, a piston in each cylinder, means for supplying a hydraulic medium under pressure to each cylinder to move the respective piston longitudinally therein, the piston of the first cylinder being provided with a rounded lower end and the piston of the second cylinder being provided with a stem extending into the path of movement of said lower end, said stem being provided with a cam face over which the rounded end of the piston of the first cylinder is adapted to ride as it is moved downwardly and the piston of the second cylinder is moved transversely in relation thereto and means restricting movement of the second piston.

3. In a hydraulic feed for machine tools, a pair of hydraulic cylinders arranged transversely to each other, a piston movable longitudinally of the first cylinder, a member movable longitudinally of the second cylinder, a cam face on said member, an extension on the piston in the first cylinder arranged to engage said cam face at the end of the stroke of said piston, means for moving both the piston and said member longitudinally of their respective cylinders by hydraulic pressure from a common source and restricting means limiting the speed of movement of said member by hydraulic pressure.

4. In a hydraulic feed for machine tools, a first and a second cylinders, arranged transversely to each other, a piston in each cylinder, hydraulic means for moving the pistons simultaneously, the stem of the second piston extending into the path of movement of the first piston and having a cam face engaged by the first piston, the arrangement being such that the cam face on said stem of the second piston limits movement of the first piston by the hydraulic medium and means restricting movement of the second piston and stem by the hydraulic medium.

5. In a hydraulic feed for machine tools, a pair of hydraulic cylinders arranged transversely to each other, a piston movable longitudinally of the first cylinder, a member movable longitudinally of the second cylinder and provided with a cam face, the piston of the first cylinder being provided with a portion riding on said cam face, means for moving both piston and said member longitudinally of their respective cylinders by hydraulic pressure and control means limiting movement of said member by the hydraulic means.

6. In a hydraulic cylinder for machine tools, a first and a second cylinder arranged transversely to each other, a piston in the first cylinder, and a piston in the second cylinder, means for applying hydraulic pressure to both pistons simultaneously, the stem of the second piston extending into the path of movement of the first piston and being formed with a cam face engaged by the first piston, the cam face being shaped to control movement of the first piston at the end of its stroke.

RALPH E. CROSS.